United States Patent
Greiner et al.

(10) Patent No.: US 7,190,858 B1
(45) Date of Patent: Mar. 13, 2007

(54) OPTICAL TIME DELAY APPARATUS INCORPORATING DIFFRACTIVE ELEMENT SETS

(75) Inventors: Christoph M. Greiner, Eugene, OR (US); Thomas W. Mossberg, Eugene, OR (US); Dmitri Iazikov, Springfield, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 91 days.

(21) Appl. No.: 11/155,327

(22) Filed: Jun. 16, 2005

Related U.S. Application Data

(60) Provisional application No. 60/580,625, filed on Jun. 16, 2004.

(51) Int. Cl.
*G02B 6/34* (2006.01)
*H04J 14/00* (2006.01)

(52) U.S. Cl. .......................... 385/37; 385/14; 385/15; 385/16; 385/17; 385/18; 385/24; 385/129; 385/130; 398/45; 398/47; 398/53; 398/82; 398/84; 398/87

(58) Field of Classification Search ............ 385/14–18, 385/24, 37, 129, 130, 131, 132; 398/45; 398/47, 53, 82, 84, 87
See application file for complete search history.

(56) References Cited

U.S. PATENT DOCUMENTS

| | | | | |
|---|---|---|---|---|
| 5,239,598 A | * | 8/1993 | Wight et al. ..................... | 385/8 |
| 5,355,237 A | * | 10/1994 | Lang et al. ..................... | 385/14 |
| 6,266,464 B1 | * | 7/2001 | Day et al. ..................... | 385/37 |
| 6,351,586 B1 | * | 2/2002 | Krol et al. ..................... | 385/39 |
| 6,393,177 B2 | * | 5/2002 | Paek ........................... | 385/24 |
| 6,563,966 B1 | * | 5/2003 | Tang ........................... | 385/10 |

* cited by examiner

*Primary Examiner*—Brian M. Healy
(74) *Attorney, Agent, or Firm*—David S. Alavi

(57) ABSTRACT

An optical time delay apparatus comprises: a multi-wavelength optical source; a diffractive element set imparting a wavelength-dependent delay on signals routed from the source to a 1×N optical switch; and N diffractive element sets routing signals from the 1×N switch to an output port. The optical propagation delay between the source and the output port varies according to the operational state of the source and the 1×N switch. A photodetector may receive the time-delayed signal at the output port.

25 Claims, 5 Drawing Sheets

OPTICAL TIME DELAY APPARATUS INCORPORATING DIFFRACTIVE ELEMENT SETS

BENEFIT CLAIMS TO RELATED APPLICATIONS

This application claims benefit of prior-filed now abandoned provisional App. No. 60/580,625 filed Jun. 16, 2004 in the names of Christoph M. Greiner, Thomas W. Mossberg, and Dmitri Iazikov, said provisional application being hereby incorporated by reference as if fully set forth herein.

BACKGROUND

The field of the present disclosure relates to optical time delay apparatus. In particular, optical time delay apparatus are described herein that incorporate diffractive element sets.

One or more distributed optical structures (i.e., sets of diffractive elements) in a channel waveguide, an optical fiber, a slab waveguide, or another guided-wave optical structure may be used in a variety of devices for beam steering, spectral filtering, laser frequency control, spectral multiplexing, optical sensing, optical delay, or other functions. It is often desirable that such devices be optimized, or nearly so, for routing, mapping, or coupling optical signals between input and output optical ports with minimal optical loss. Apparatus incorporating diffractive element sets for providing time-delayed optical signals are described herein. Such time delay apparatus may, for example, function as true-time delay devices which are relevant in the case of phased array radar systems or other applications.

Various embodiments, implementations, and adaptations of such diffractive element sets are disclosed in: application Ser. No. 11/062,109 filed Feb. 17, 2005; pending, application Ser. No. 11/055,559 filed Feb. 9, 2005; now U.S. Pat. No. 7,123,744, application Ser. No. 11/021,549 filed Dec. 23, 2004; pending application Ser. No. 10/998,185 filed Nov. 26, 2004; now U.S. Pat. No. 6,993,223, application Ser. No. 10/989,236 filed Nov. 15, 2004; now U.S. Pat. No. 6,965,716, application Ser. No. 10/898,527 filed Jul. 22, 2004; pending application Ser. No. 10/989,244 filed Nov. 15, 2004; now U.S. Pat. No. 6,961,491, application Ser. No. 10/798,089 filed Mar. 10, 2004 (now U.S. Pat. No. 6,823,115 issued Nov. 23, 2004); application Ser. No. 10/653,876 filed Sep. 2, 2003 (now U.S. Pat. No. 6,829,417 issued Dec. 7, 2004); application Ser. No. 10/602,327 filed Jun. 23, 2003; now U.S. Pat. No. 6,859,318, application Ser. No. 10/229,444 filed Aug. 27, 2002 (now U.S. Pat. No. 6,678,429 issued Jan. 13, 2004); application Ser. No. 09/843,597 filed Apr. 26, 2001; now U.S. Pat. No. 6,965,464, and application Ser. No. 09/811,081 filed Mar. 16, 2001 (now U.S. Pat. No. 6,879,441 issued Apr. 12, 2005). Each of said applications is hereby incorporated by reference as if fully set forth herein.

The following publications are also incorporated by reference as if fully set forth herein: Mossberg, "Planar holographic optical processing devices," Opt. Lett. 26 414 (2001); Greiner et al., "Lithographically-fabricated planar holographic Bragg reflectors," J. Lightwave Tech. 22 136 (2004); Greiner et al., "Fourier-transform-limited performance of a lithographically-scribed planar holographic Bragg reflector," Photon. Technol. Lett. 16 840 (2004); Iazikov et al., "Apodizable integrated filters for coarse WDM and FTTH-type applications," J. Lightwave Tech. 22 1402 (2004); Mossberg, "Lithographic holography in planar waveguides," SPIE Holography Newsletter 12 (2001); Iazikov et al., "Effective grayscale in lithographically scribed planar holographic Bragg reflectors," Appl. Opt. 43 1149 (2004); Boggs et al., "Simple high-coherence rapidly tunable external-cavity diode laser," Opt. Lett. 23 1906 (1998).

SUMMARY

A first apparatus comprises: a 1×N optical switch connecting a switch input optical port to any one of N switch output optical ports based on a selected operational state of the 1×N optical switch; and an optical waveguide having N sets of diffractive elements. The optical waveguide substantially confines in one transverse dimension an optical signal received from any of the N switch output optical ports and propagating in two dimensions therein. Each set of diffractive elements corresponding to one of the N switch output optical ports and is configured and positioned for routing at least a portion of an optical signal received from the corresponding one of the N switch output optical ports to an output optical port. The N diffractive element sets and the output optical port are positioned relative to the switch output optical ports so that each corresponding optical pathlength between each of the switch output optical ports and the output optical port varies among the switch output optical ports, thereby resulting in an optical propagation time delay between the switch input optical port and the output optical port that varies according to the selected operational state of the 1×N optical switch.

A second apparatus comprises: an optical waveguide having a set of diffracting elements configured and positioned for routing at least a portion of an optical signal propagating in the optical waveguide between an input optical port and an output optical port; and an optical source positioned for launching an optical signal into the optical waveguide through the input optical port. An optical signal at only a selected one of multiple optical source wavelengths reaches the output optical port based on a selected operational state of the optical source. The optical waveguide substantially confines in one transverse dimension an optical signal propagating in two dimensions therein. The diffractive element set is adapted for imparting a wavelength-dependent optical delay onto the routed portion of the optical signal, thereby resulting in an optical propagation time delay of an optical signal launched from the optical source between the input optical port and the output optical port that varies according to the selected operational state of the optical source.

A third apparatus combines the first and second apparatus, so that the optical signal is routed by the diffractive element set imparting the wavelength-dependent optical delay from the input optical port to the switch input optical port, and then to the corresponding output port. The optical propagation delay between the input port and the corresponding output port varies according to selected operational states of both the optical source and the 1×N optical switch.

Objects and advantages of optical time delay apparatus incorporating diffractive element sets may become apparent upon referring to the exemplary embodiments illustrated in the drawings and disclosed in the following written description and/or claims.

BRIEF DESCRIPTION OF THE DRAWINGS

In FIG. 1A the upper cladding is missing to reveal the diffractive elements.

Figure 1A:
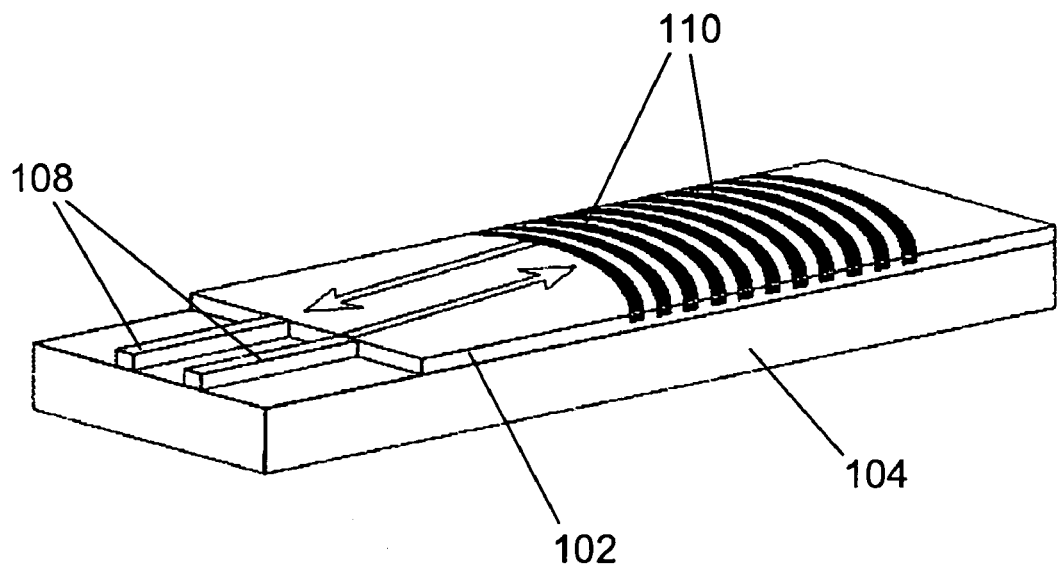
FIGS. 1A and 1B are schematic perspective and longitudinal cross sectional views, respectively, of a planar waveguide with a diffractive element set.

In the Figures, typically only a few diffractive elements are shown out of an entire diffractive element set, which may contain anywhere from a few, dozens, hundreds, or even thousands of diffractive elements. The Figures may illustrate the waveguide or diffractive elements schematically, and therefore may not show all structures in their proper shape or proportions. The lines or curves representing the diffractive elements, or the contours defining them, do not necessarily represent their actual shapes. In particular, straight lines in some of the Figures may in fact represent elements or contours that may be curved in actual devices, and vice versa. It should be noted that while many of the exemplary embodiments shown or described herein have a diverging input beam mapped by diffractive elements within a diffractive transformation region into a converging output beam, the present disclosure or appended claims also encompass embodiments in which input and output beams may include any desired combination of converging, diverging, or substantially collimated beams. The embodiments shown in the Figures, and their corresponding layouts, are exemplary only, and should not be construed as limiting the scope of the present disclosure and/or appended claims.

DETAILED DESCRIPTION OF EMBODIMENTS

A planar optical waveguide is generally formed on or from a substantially planar substrate of some sort, which may be substantially flat or may be somewhat curved, bent, or deformed. The confined optical signals typically propagate as transverse optical modes supported or guided by the planar waveguide. These optical modes are particular solutions of the electromagnetic field equations in the space occupied by the waveguide, with each mode being characterized by its respective amplitude variation along the confined dimension. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. More generally, the adaptations disclosed or claimed herein may be implemented in any guided-wave optical structure, including grating-like structures. The disclosed adaptations may be applied to channel, slab, rib, fiber, and other guided-wave optical structures known in the art. In the present disclosure, planar waveguides are specifically referred to for concreteness only, and the various exemplary embodiments described herein may be implemented in other guided-wave optical structures as well. In some portions of an optical signal pathway, an optical signal may propagate without confinement as a free-space optical beam. Typically, but not necessarily, such free-space propagation regions involve initial or terminal legs at optical signal sources or receivers, respectively.

The planar waveguide typically comprises a core surrounded by lower-index cladding (often referred to as upper and lower cladding, or first and second cladding; these may or may not comprise the same materials). An example in Shown in FIGS. 1A and 1B, wherein core 102 is positioned between cladding layers 104 and 106 (the cladding layer 106 is missing from FIG. 1A to show underlying structure). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The indices $n_1$, $n_2$, or $n_{core}$ may be spatially substantially uniform over the planar waveguide, or may spatially vary over the extent of the planar waveguide, as set forth hereinbelow. The core or cladding(s) may comprise multiple materials having different indices. A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons.

Figure 1B:
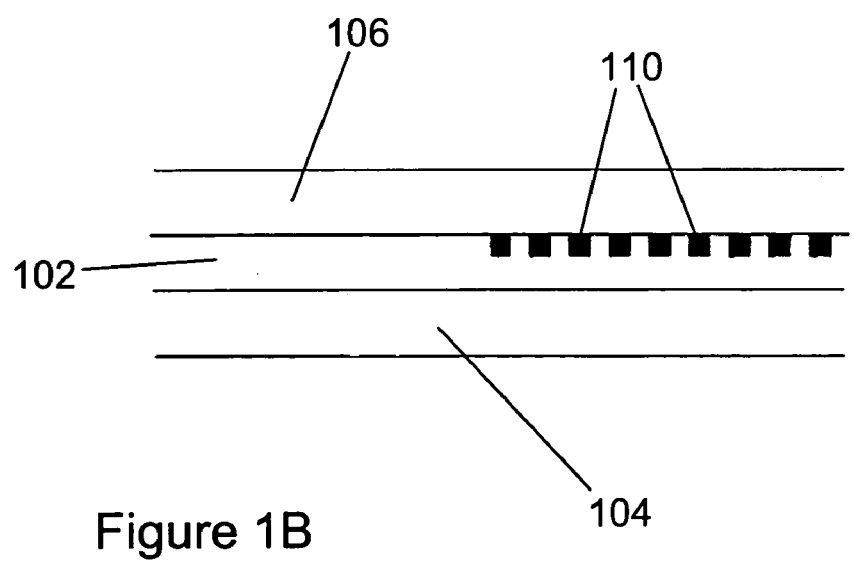

A set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprise some suitable alteration of the planar waveguide (ridge, groove, index modulation, density modulation, and so on), and are spatially defined with respect to a corresponding virtual one- or two-dimensional linear or curvilinear diffractive element contour, the curvilinear shape of the contour typically being configured to impart desired spatial characteristics onto the diffracted portion of the optical signal. An example is shown in FIGS. 1A and 1B, with diffractive elements 110 formed at the boundary between core 102 and cladding 106 as trenched in the core 102 filled with a different material, possibly but not necessarily the material of cladding layer 106. It should be noted that the terms "diffractive contour" and "diffractive element" are sometimes used interchangeably in the present disclosure. Implementation of a diffractive element with respect to its virtual contour may be achieved in a variety of ways, including those disclosed in the references cited herein. In some instances, each diffractive element individually transforms input signal wavefronts to the form appropriate to desired output signals. More generally, and particularly when optical signals are transformed from guided optical modes to free-space propagating modes, desired wavefront transformations may be effected through the coherent action of the entire diffractive element set. The relative spatial arrangement (e.g. longitudinal spacing) of the diffractive elements of the set, and the relative amplitude diffracted from each diffractive element of the set, yield desired spectral and/or temporal characteristics for the overall diffracted optical signal. It should be noted that an optical port (input or output; source or receiver) may be defined structurally (for example, by an aperture, waveguide, fiber, lens, or other optical component) and/or functionally (for example, by a spatial location, convergence, divergence, collimation, and/or propagation direction). In the example of FIGS. 1A and 1B, channel waveguide 108 define the input and output optical ports. The terms input, output, source, and receiver are frequently used herein for describing ports for convenience only, since the optical elements involved are typically reciprocal and light could also be guided from a receiver port to a source port or from an output port to an input port. For a single-mode planar waveguide, a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented. Diffractive element sets may be arranged for transforming confined optical signals into general free-space wavefronts (and vice versa) including diverging, converging, and collimated wavefronts.

The diffractive elements of a set (or equivalently, their corresponding contours) are spatially arranged with respect to one another so that the corresponding portions of the optical signal diffracted by each element interfere with one another along an output segment of the optical signal path so as to impart desired spectral, temporal, or spatial characteristics onto the portion of the optical signal collectively diffracted from the set of diffractive elements and routed along the optical signal path. In the case that a diffractive element set effects a transformation between optical signals that are both confined by the waveguide, the diffractive elements of the set are arranged so that an input optical signal, entering a region of the waveguide containing the diffractive element set, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal (even at high angles-of-incidence), and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements). In the case that a diffractive element set effects a transformation between one optical signal confined by the waveguide and another optical signal which is not confined by the waveguide, the diffractive elements of the set are typically arranged in a manner similar to the arrangement of diffractive elements of a thin grating relative to the non-confined optical signal, while the confined optical signal passes through the diffractive elements in a successively incident manner as described hereinabove. Alternatively, if the waveguide is sufficiently thick, the non-confined signal may pass through diffractive elements in a successively incident manner.

As set forth in prior-filed co-pending application Ser. No. 10/998,185 (cited hereinabove), now U.S. Pat. No. 6,993,223, diffracting regions of a diffractive element set may be distributed over one or more spatial regions of the optical element, for facilitating placement of multiple diffractive element sets in a single optical element. These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

A given set of diffractive elements may provide dual functionality, spatially routing a diffracted portion of an optical signal between successive portions of an optical signal path, while perhaps at the same time acting to impart a spectral/temporal transfer function onto the diffracted portion of an input optical signal to yield an output optical signal. It may be the case that the spectral/temporal transfer function is unity for routed signals, or it may be the case that non-unity spectral/temporal transfer functions may be implemented to modify routed optical signals in some desired manner. The diffractive elements may be designed (by computer generation, for example) so as to provide optimal routing, imaging, or focusing of the optical signal between segments of an optical signal pathway. Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited herein. The following are exemplary only, and are not intended to be exhaustive. The teachings of the present disclosure pertaining to design of diffractive element sets may be implemented regardless of the method(s) employed for forming the planar waveguide or diffractive element set(s) thereof. The teachings of the present disclosure enable the design of a wide range of diffractive element sets providing for general wavefront and directional transformations between input and output beams.

Diffractive elements may be formed lithographically (projection photolithography, contact photolithography, immersion lithography, e-beam or ion-beam lithography, or other suitable techniques to provide requisite spatial feature size resolution and spatial coherence, i.e. absolute feature placement accuracy) using etch methods on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask onto the surface of the planar waveguide (referred to herein as external photoexposure) so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes using masters patterned mechanically or lithographically. A pattern used as a phase mask may be stamped onto the core or cladding surface followed by optical exposure to create diffractive elements throughout the core and or cladding region. The optical or UV source used to write the diffractive elements in this case should optically have a coherence length comparable or longer than the distance from the stamped phase mask to the bottom of the core region. Sources with shorter coherence lengths may be employed provided diffractive elements are not required to span the entire core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the diffractive element set. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools or via calculated interference of simulated design optical beams as disclosed herein. Simple curves (e.g. conic sections) may be employed as approximations of the fully optimized contours. Diffractive element virtual contours may be spaced by an optical path difference (as described above) that provides for the routed output of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between corresponding routed outputs at the output port, and/or the diffractive strength of the elements may be individually controlled as well (as described in detail in the references cited hereinabove).

A diffractive element set for transforming an optical signal entrant to a diffractive transformation region of an optical signal path into an optical signal suitable for propagating through the next segment of the optical signal path may be designed by calculating an interference pattern between simulated entrant and transformed optical signal fields at a desired wavelength and with desired spectra, temporal waveforms, or spatial wavefronts entering and exiting the diffractive transformation region. In forming or writing a pattern for the diffractive element set, suitable discretization is applied as needed for any lithographic or UV exposure approach that is utilized for fabrication. The diffractive element set may be designed by interference of computer-generated beams having the desired computer-generated temporal waveforms (explicitly time-dependent or continuous-wave), with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform. Various exemplary embodiments of such interferometric design of diffractive element sets are set forth in application Ser. No. 11/055,559 cited hereinabove. In the present disclosure, it is generally desirable to preserve the spectral and temporal properties of routed optical signals. To do so, simulated design fields having a temporal width short enough to fill the design operational bandwidth are desirable. Alternatively, diffractive element sets designed using continuous wave design fields may be spatially apodized or phase-shifted according to the incorporated references to provide desired spectral and temporal transformation properties.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate in the planar waveguide (referred to herein as internal photoexposure), thereby recording in the planar waveguide an interference pattern. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, temporal delay resolution, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

In the present disclosure are disclosed methods for designing and fabricating diffractive element sets as well as a broad range of diffractive element set geometries. Diffractive element sets designed according to the disclosed methods may efficiently map or couple virtually any input optical wavefront into any desired output optical wavefront, whether the input and output signals propagate in the same, opposite, or in angled directions, whether the input and output ports or sources are spatially extended or point-like, or whether the input-to-output mapping or coupling occurs under conditions wherein a paraxial approximation would be appropriate or whether input or output signals propagate in a waveguide or not. In order to achieve optimal or near-optimal mapping or coupling of input and output optical signal modes, the virtual contours defining the diffractive elements are typically complicated and may be calculated by computation of interference between simulated optical fields representing the input and output optical signal beams that the diffractive element set is intended to couple.

The diffractive element sets (also referred to as distributed optical structures) designed as disclosed herein may provide substantially full waveform reconstruction and/or manipulation of input fields. Such may be achieved under conditions (e.g. non-paraxial limit or extended optical sources) where simple imaging structures (e.g. conic sections) may not provide sufficiently optimized mapping or coupling, and may enable substantially optimized beam routing or highly efficient coupling to various output media (e.g. fiber or channel waveguides). Such waveform control may also be employed in cascading signals through multiple processing diffractive element sets along the optical signal pathway. The diffractive element sets disclosed herein may also enable beam mapping or coupling geometries in slab waveguides such as: acute-, right-, or obtuse-angle bends; forward-focusing or relaying structures; or out-of-plane bends. Diffractive element sets designed as disclosed herein may also enable high-fidelity mapping of spatially extended optical sources (i.e. non-paraxial or non-point-like), or may enable novel beam mapping or coupling functions, such as efficiently converting one mode into another one of different size or profile. Diffractive element sets designed as disclosed herein may be employed in an optical time delay module to provide optical signal routing along multiple optical signal paths without restrictions imposed by signal overlap or intersection.

The use of diffractive element sets implemented in planar waveguides enables fabrication and operation of optical time delay modules for true time delay (TTD) and other applications that are highly scalable in terms of both accessible maximum time delays and available delay resolution. Several exemplary time-delay modules are described herein that enable time delay of optically-carried radio-frequency (RF) signals over a range of about 0.5 GHz to about 50 GHz. The exemplary time-delay modules may be monolithic- or hybrid-integrated devices occupying areas on the order of about 10 cm$^2$. In the following exemplary embodiments, time delays are set using a combination of wavelength-dependent and switch-selected signal paths. Time delay modules using only wavelength-dependent signals paths or only switch-selected signal paths shall also fall within the scope of the present disclosure or appended claims. The exemplary time delay modules exhibit 8-bit time resolution, generating 256 different time delays. Other resolutions, both higher and lower, shall fall within the scope of the present disclosure or appended claims.

5-GHz Optical Time Delay Module

Figure 2A:
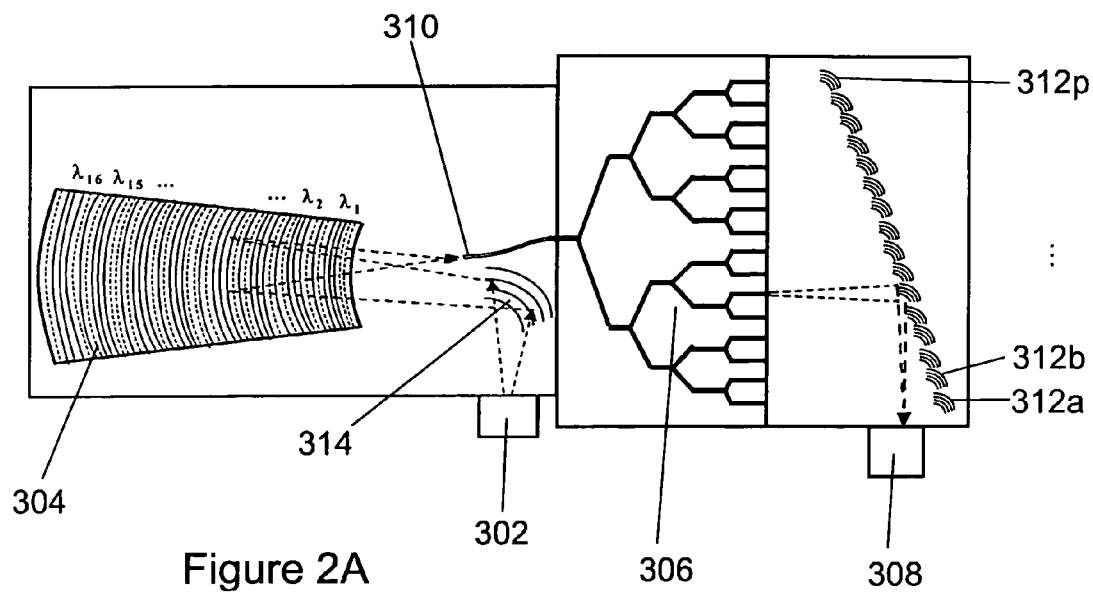
FIGS. 2A and 2B illustrate schematically exemplary optical time delay modules.
Figure 2B:
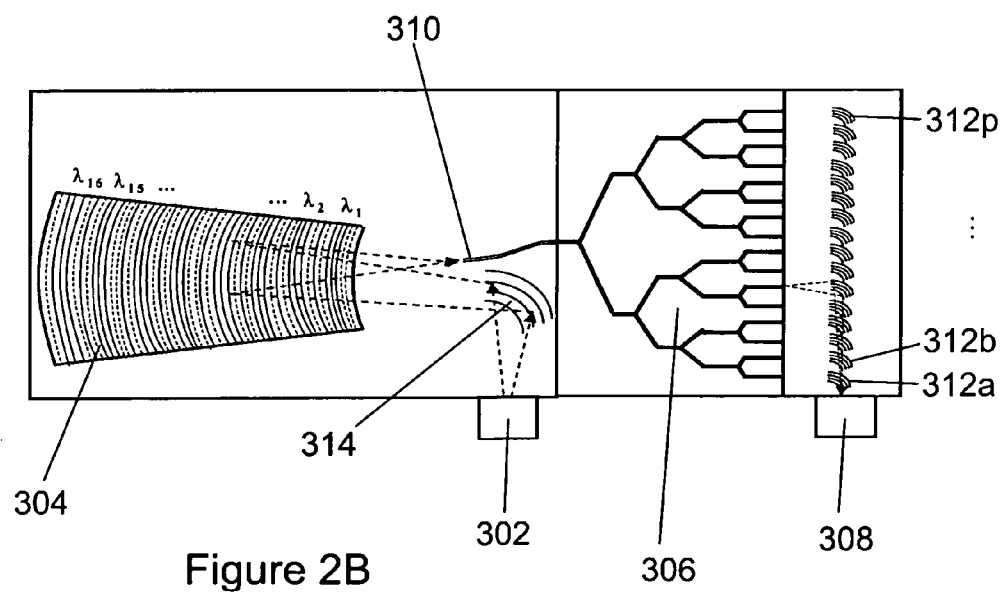

FIGS. 2A and 2B depict schematically exemplary 8-bit-resolution optical time delay modules incorporating diffractive element sets and providing optical time delays up to 200 ps with an absolute delay resolution of about 0.78 ps (i.e. about 200/256 ps). The exemplary time delay module comprises: (i) a modulated (at up to about 5 GHz) optical source 302 providing an optical input signal at any one or more of sixteen source wavelengths $\lambda_1, \lambda_2, \ldots \lambda_{16}$ based on a selected operational state of the optical source; (ii) a wavelength-chirped diffractive element set 304 that provides coarse time delays with values (N−1)×12.5 ps, where N∈{1, 2, ... 16} by selection of a corresponding source operational state; (iii) a 1×16 optical switch 306; (iv) an array of 16 broadband diffractive element sets 312a, 312b, ... 312p that each provide a substantially achromatic time delay via optical path length differences to the output port; and (v) a photo detector 308.

In the present example, the element spacing in the diffractive element set 304 is chirped (i.e., the spacing varies monotonically along the propagation direction through the set) so that each of the sixteen different source wavelengths is diffracted from a different longitudinal region within the approximately 2-cm-long device. By selecting an operational state of the optical source 302 (i.e. selecting a source wavelength), a coarse time delay is selected. As noted in various of the cited references, such a diffractive element set typically exhibits low insertion loss (typically less than 1 dB; often less than 0.5 dB). Simulation results for high-reflectivity diffractive element sets have yielded a 1/e extinction lengths of around 100 µm, indicating that a 2 cm long device may provide insertion loss of less than 1 dB over an aggregate reflection bandwidth of several hundred nanometers while providing coarse wavelength-dependent time delays. Alternatively, the total reflective bandwidth of diffractive element set 304 may be decreased down to approximately $N^2 c/2n_{eff} L$, where N is the number of wavelength channels, c is the speed of light, $n_{eff}$ is the effective waveguide refractive index, and L is the length of the diffractive element set. This further enables tailoring of the spectral passband of the delay-generating diffractive element set 304 to the requirements of a particular optical source 302. Such tailoring of the spectral profiles corresponding to the various time-delays may include, e.g. designing to substantially suppress coherent beating between source wavelengths associated with different time delays. Furthermore, wavelength-dependent time-delay channel and passband design may also be optimized in accordance with light source properties such as tuning range, wavelength accuracy, and so forth.

Instead of using a chirped diffractive element set 304, a diffractive element set may be used comprising subsets of diffractive elements, wherein each subset routes one source wavelength between the optical source 302 and the optical switch 306. The subsets are arranged so as to impart the desired wavelength-dependent temporal delays on the optical signals. The diffractive element subsets may occupy distinct or partially overlapping spatial regions of the optical waveguide, and may be arranged in arbitrary order. The reflective bandwidth of a given diffractive element subset affecting a particular wavelength-dependent time delay typically is chosen to be at least comparable or preferably larger than the bandwidth of the modulated optical signal. In various of the exemplary embodiments shown herein (including those of FIGS. 2A and 2B) a broadband diffractive element set 314 routes the optical signal entering the waveguide from the optical source 302 through an input optical port to the diffractive element set 304. Other arrangements may be implemented wherein the diffractive element set 314 is not required, i.e., wherein optical signals entering through an input optical port are otherwise routed to or impinge directly on diffractive element set 304. All such arrangement fall within the scope of the present disclosure or appended claims.

After undergoing the initial wavelength-dependent coarse time delay imparted by the first diffractive element set 304, the delayed optical signal is routed through a switch input optical port 310 to a second time delay generator comprising a 1×16 optical switch 306 and multiple optical delay lines based on 16 additional diffractive element sets 312a . . . 312p. The 1×16 optical switch may be implemented in a planar-lightwave-circuit-based (PLC-based) platform, or in any other suitable format or platform. The 1×16 optical switch 306 may be based on an electro-optic Mach-Zender interferometer architecture, a waveguide-sampled hologram in combination with phase modulators (as in U.S. Pat. No. 6,823,115), or any other suitable 1×N optical switching structure. Each one of the additional diffractive element sets 312a . . . 312p is configured and positioned to route an optical signal from a corresponding one of the switch outputs to a time delay module output optical port (located at detector 308 in the exemplary embodiments of FIGS. 2A and 2B). The additional diffractive element sets 312a . . . 312p are designed to route signals of all wavelengths produced by the optical source. The optical switch outputs and the additional diffractive element sets 312a . . . 312p are arranged so that each corresponding optical pathlength between each of the switch outputs and the time delay module output optical port (at detector 308 in this example) varies among the switch outputs. Additional switch-dependent time delay may be incorporated into the switch itself, or the switch may be configured so that propagation delay through the switch is channel-independent. In either case, selecting a particular operational state of the 1×16 switch 306 enables selection of one of 16 additional fine time delays with values of (M−1)×0.78 ps, where M∈{1, 2, . . . 16}. The delayed optical signal may be converted to an RF electrical signal by a high-speed photo-detector 308 positioned for receiving the optical signal from the time delay module output port, or may be routed through the output port for further optical processing (into another optical waveguide or into an optical fiber, for example; not shown). The overall time delay between the optical source 302 and the output port or photodetector 308 varies according to the operational states of the optical source 302 and the 1×16 switch 306, which in this example may be varied over 200 ps with 8-bit resolution (i.e. 0.78 ps resolution).

In FIG. 2A, the additional diffractive element sets 312a . . . 312p are arranged so that an optical signal routed by one set substantially avoids the others as it propagates to the output port, so as to reduce optical losses due to the other diffractive element sets. Such an arrangement may be necessary or desirable in cases wherein the additional diffractive element sets 312a . . . 312p are highly reflective, or to achieve high optical throughput, and may be well-suited for routing the delayed optical signals to a photodetector or photodetector array, or into a multi-mode waveguide or fiber at the output port. The arrangement of FIG. 2B, wherein optical signal routed by one of the additional diffractive element sets 312a . . . 312b may intersect one or more of the others, might be suitably employed in cases wherein: each of the additional diffractive element sets is only partially reflective, optical throughput is not at a premium, device size is constrained, or single-mode optical output (independent of time delay) is needed or desired.

It should be noted that time resolution of 0.78 ps requires spatial separation of about only 160 µm between adjacent ones of the 16 additional diffractive element sets 312a . . . 312p. This time delay resolution may be achieved using diffractive element sets 312a . . . 312p sufficiently short so that adjacent diffractive element sets do not spatially overlap (as shown in FIGS. 2A and 2B). The transform-limited bandwidth of diffractive element sets about 100-µm in length is about 8 nm at an operational wavelength of 1.5 µm, which is sufficiently large, for example, to reflect 16 different wavelengths at the 50-GHz spacing characteristic of the ITU-DWDM grid in C-band. Sufficiently high reflectivity may be attained with diffractive element sets 312a . . . 312p of about this length (1/e attenuation length of about 100 µm), thereby maintaining time-delay insertion losses below 1 dB or even 0.5 dB. Alternatively, the 16 additional diffractive element sets 312a . . . 312b may at least partially overlap one another, using various techniques or configurations disclosed in the cited references. Alternatively, instead of the additional diffractive element sets, broadband reflectors may be formed comprising deeply etched and metallized trenches cut entirely or partly through the core waveguide layer.

The total time delay and the time resolution may be scaled by scaling the size of the first diffractive element set 304 and the spatial separations between the additional diffractive element sets 312a . . . 312p, and the bit-resolution is determined by the number of source wavelengths that may be chosen from and the number N of outputs of the 1×N optical switch 306. Distinct wavelength channels may number from one (wherein the time delay is strictly switch-based) or two through 8 or 16 or 32 up to hundreds of wavelength channels, while the number of switch outputs N may also range from one (wherein the time delay is strictly wavelength-based) or two through 8 or 16 up through hundreds of switch output channels. The total delay of about 200 ps in the preceding example is based on an overall length of about 2 cm for the first diffractive element set, which may be varied as needed within constraints such as, inter alia, overall device size (which imposes an upper limit). Similarly, the smallest time delay increment (0.78 in the preceding example) may be limited by the degree to which the additional diffractive element sets 312a . . . 312p may be formed in partially overlapping spatial regions. The bit resolution may be limited by the number of distinct source wavelengths that may be used, and the number of switch channels and additional diffractive element sets that may be formed within any size constraints.

The use of diffractive element sets implemented in a slab waveguide readily enables monolithic integration of the first diffractive element set 304, the 1×N optical switch 306, and the N additional diffractive element sets 312a . . . 312p forming the optical delay line. All may be patterned and formed simultaneously on a common waveguide substrate, such as a silica-on-silicon platform, or planar lightwave circuit platform (PLC), or any other suitable platform. Alternatively, any suitable hybrid integration scheme may be employed. The optical source 302 or the photodetector 308 may also be integrated, by hybrid integration schemes, or in some cases by monolithic integration. The optical source 302 may be positioned for launching optical signals into an edge of the planar waveguide structure containing the diffractive elements, and the photodetector 308 may be similarly positioned for receiving optical signals through an edge of the planar waveguide structure. Alternatively, the optical source 302 or the photodetector 308 may be positioned for launching or receiving signals that are not confined by the planar waveguide structure, but are coupled to the waveguide in the manner described in cited application Ser. No. 11/062,109 using diffractive element sets for forming optical interconnect structures.

It should be noted that each stage of the time delay modules of FIGS. 2A and 2B may be used independently. A multi-wavelength optical source 302 may be used with a time-delay-generating diffractive element set 304, and all different time delays selected by only selecting an optical source wavelength. The bit-resolution of such a system depends only on the number of available wavelengths. Alternatively, a 1×N optical switch 306 may be used with N additional diffractive element sets 312a . . . 312p, and the time delay set only by the operational state of the switch. Both of these variations shall fall within the scope of the present disclosure or appended claims. It should be further noted that the stages of the time delay module of FIG. 2B may be used in the opposite order, that is, the optical signal may first be delayed by the 1×N switch 306 and diffractive element sets 312a . . . 312p, and then by diffractive element set 304.

50-GHz Optical Time Delay Module

Figure 3A:
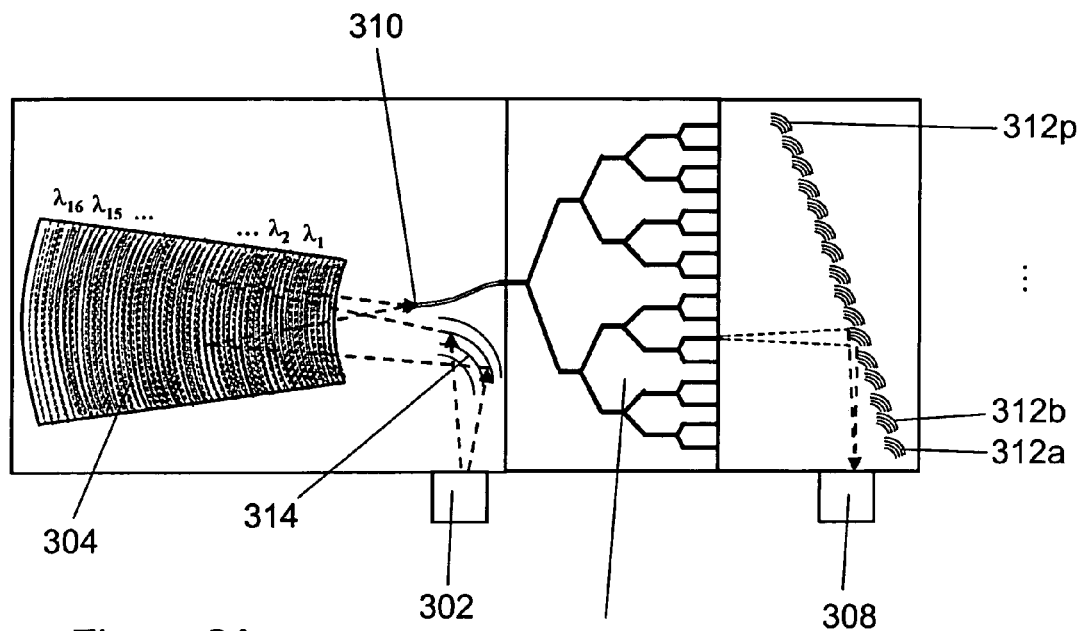
FIGS. 3A and 3B illustrate schematically exemplary optical time delay modules.
Figure 3B:
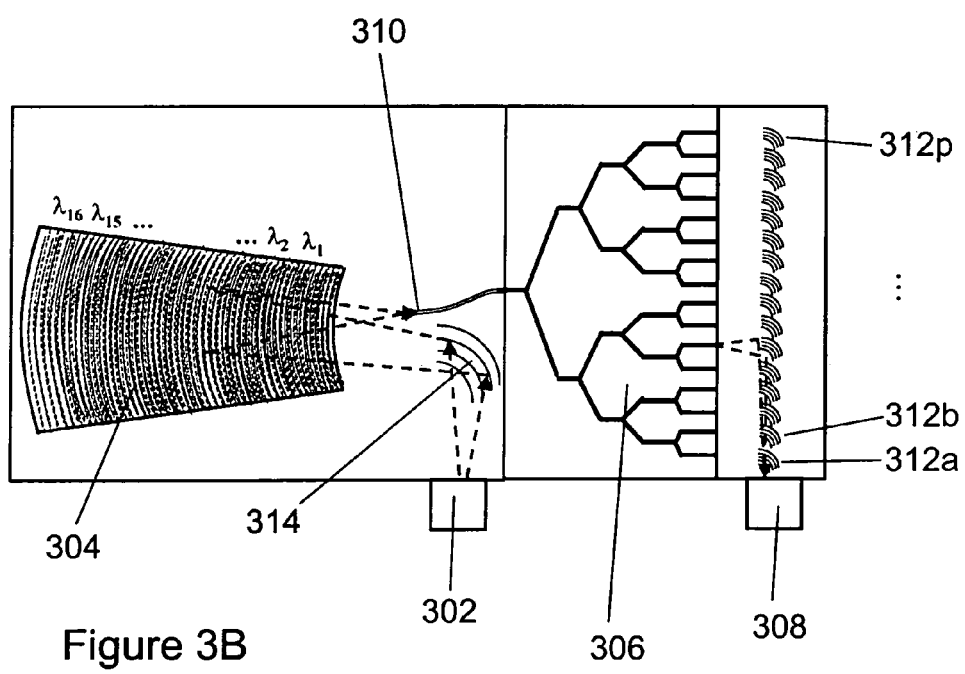

FIGS. 3A and 3B depict schematically exemplary optical time delay modules based on diffractive element sets for delaying a 50 GHz RF-modulated optical signal by up to a full cycle with 8-bit time resolution. Compared to the examples depicted in FIGS. 2A and 2B, the roles of providing coarse and fine time delays are reversed. Sixteen fine delay increments are selected through wavelength dependence of the delay through the first diffractive element set 304, while coarse delays increments are selected based on the operational state of the 1×16 switch 306. In this specific example, the time delay module provides 256 different time delays (8-bit resolution) ranging from 0 to 20 ps, in increments of about 0.078 ps (i.e., 20/256 ps). Such small temporal increments cannot be obtained from spatially distinct segments of the first diffractive element set 304, since if high reflectivity is desired (i.e. low insertion loss), the smallest obtainable temporal increment obtainable by spatially distinct diffractive element subsets is limited to about 1 ps (corresponding to about 100 µm, roughly the minimum readily obtainable 1/e attenuation length). This limitation may be overcome by spatially superimposing diffractive element subsets by means of techniques disclosed in various of the cited references. Temporal delay resolution achievable by spatially overlapping diffractive element subsets is limited by the feature placement accuracy and resolution of the spatially-selective processing employed for forming the diffractive elements (e.g. photolithography). Presently obtainable spatial resolution implies achievable delay resolution down to a few percent of an optical cycle at 1.5 µm wavelength. Coarse delays with values of (N−1)×1.25 ps, where N∈{1, 2, . . . 16}, are provided by selecting an output channel of the PLC-based 1×16 optical switch 306 coupled to an optical delay line comprising 16 additional diffractive element sets 312a . . . 312p arranged as described hereinabove for routing optical signals between the switch output channels and the time delay module output optical port.

Optical Time Delay Module for 500-MHz RF Optical Signals

Figure 4:
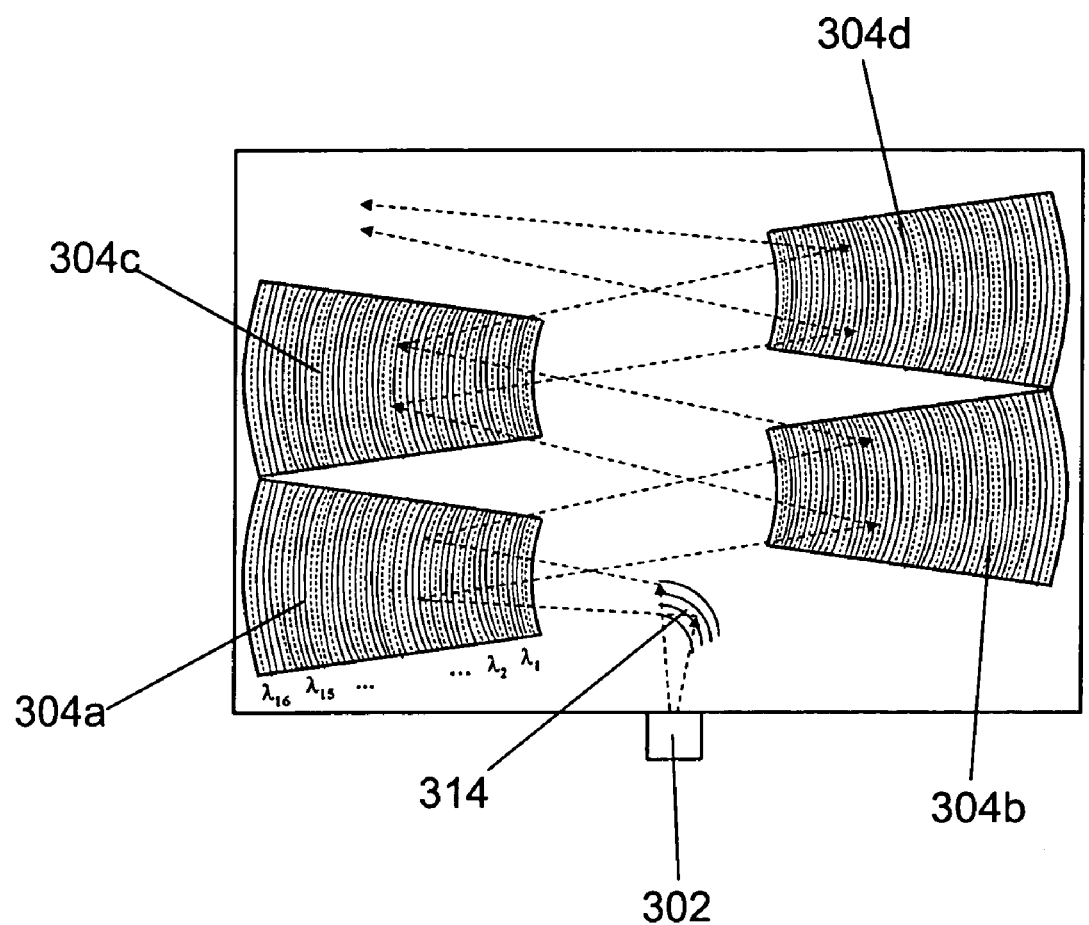
FIG. 4 illustrates schematically multiple diffractive element set arranged in series.

Time delays longer than several hundred picoseconds may be obtained by placing two or more diffractive element sets in series, with an output of one diffractive element set serving as an input for the next (as illustrated schematically in FIG. 4, with wavelength-dependent-delay-generating diffractive element sets 304a . . . 304d). Each of the series diffractive element sets 304a . . . 304d provides wavelength-dependent temporal delay as described previously (chirped elements, spatially distinct subsets, or spatially overlapping subsets). Each diffractive element set in the series provides a maximum total time delay of about $2n_{eff}L/c$, where $n_{eff}$ is the effective waveguide index in the region of the diffractive element set, L is the length of the diffractive element set, and c is the speed of light. As in the previous exemplary embodiments, the output of a 16-wavelength-based delay line may be routed to an optical-switch-based delay line (including additional diffractive element sets) for providing additional finer time delay increments. Alternatively, large time delays may be achieved with a single wavelength-dependent diffractive element set if constraints on overall device size are relaxed. For example, the maximum spacing between spatially distinct diffractive element subsets may potentially be as large as the diameter of wafer on which the optical waveguide is fabricated, thereby providing time delays between different colors of up to 3 ns (for a 12 inch silica-on-silicon wafer) in a fully-integrated format.

Figure 5A:
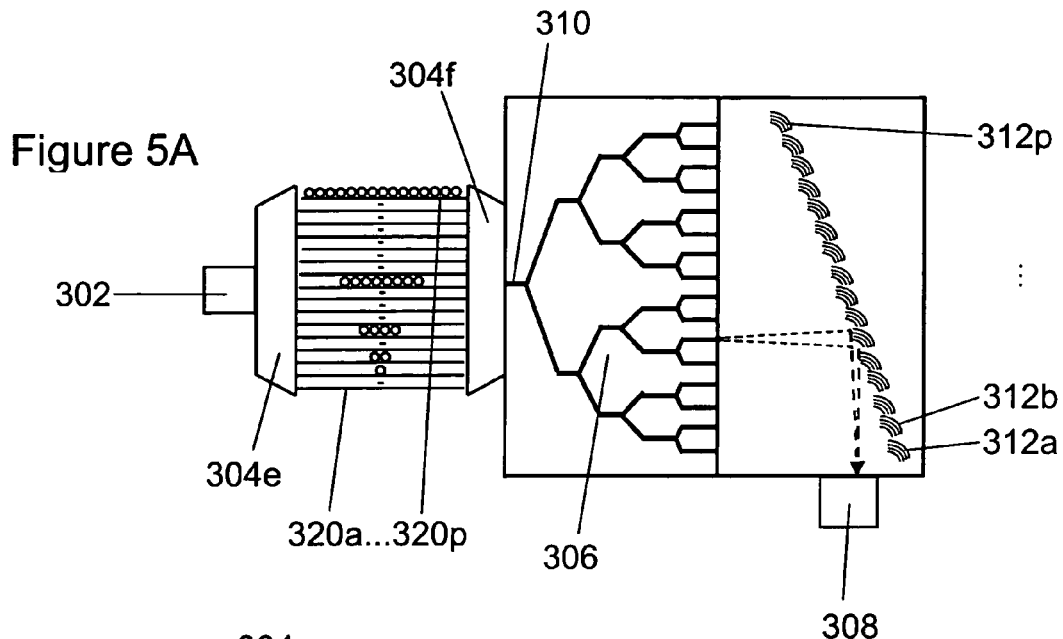
FIGS. 5A–5C illustrate schematically an exemplary optical time delay module.
Figure 5B:
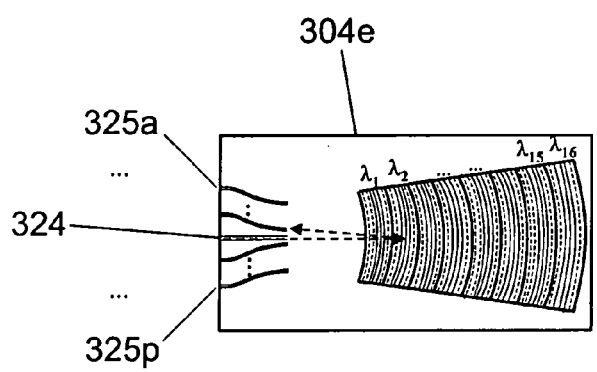
Figure 5C:
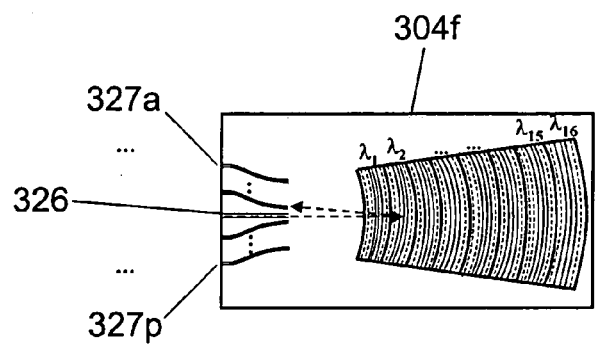

Even longer time delays are available by incorporating optical fiber (or optical waveguide) delay lines 320a . . . 320p between the first diffractive element set 304e and the optical switch, as depicted schematically in FIGS. 5A, 5B, and 5C. The first diffractive element set 304e may function strictly as a multiplexer for wavelength-dependent routing of an optical signal from an input port 324 through ports 325a . . . 325p into a corresponding one of the delay lines 320a . . . 320p, or the first diffractive element set 304e may also provide additional wavelength-dependent optical delay. Another diffractive element set 304f (with or without wavelength-dependent optical delay) serves to de-multiplex the delayed optical signals received from the optical fiber delay lines 320a . . . 320p through corresponding ports 327a . . . 327p and route them through port 326 to an input port 310 1×N switch-based delay structure. Use of diffractive element multiplexers 304e and 304f and fiber delays 320a . . . 320p as is shown in FIGS. 5A–5C provides 16 coarse delay increments of 125 ps each (or other suitable increment). The subsequent switch-based 4-bit delay line provides 7.8 ps increments (or other suitable increment). The resulting 8-bit optical time delay module is capable of delaying a 500-MHz RF optical signal by one full cycle. It should be noted that the 16-channel multiplexer shown in FIGS. 5A–5C may be formed with multiplexer input and output ports (324/325a . . . 325b for element set 304e; 326/327a . . . 327p for element set 304f) on the same die side, thereby alleviating alignment and integration of the multiplexer with fiber arrays. Other arrangements may be employed as well. The overall time delay available in the implementation of FIGS. 5A–5C is set by the length of optical fiber delay lines used.

Light Sources for Time Delay Module

The modulated optical source is an important component of the disclosed optical time delay modules. Its properties must be considered in the appropriate design of time delay modules. Examples of light sources that may be employed in time delay modules disclosed herein may include, but are not limited to, the following examples.

Laser arrays: Multiple integrated lasers (DFB or other), each producing a different wavelength, may be multiplexed onto a common optical path within the planar waveguide by use of a diffractive element set or by any other suitable multiplexer. Laser arrays and multiplexing thereof are known in the art. Modulation (i.e. imprinting a desired RF signal onto the laser optical signal) may be achieved by direct modulation of the drive current of a selected laser, or by use of an external modulator (a separate modulator for each laser of the array, or a common modulator for the multiplexed output of the array). Wavelength-dependent time delay selection may occur by current-switching (above or below threshold) of the appropriate laser, so that only one laser operates. Alternatively, if each laser of the array is independently modulated, then all lasers may operate simultaneously with one laser modulated with the desired RF signal and the others substantially blocked by their respective modulators.

Tunable lasers: Semiconductor lasers, such as DBR or DFB lasers, may be tuned in quasi-continuous or continuous fashion over bands of 10–15 nm. With overlaid sampled gratings such lasers may potentially be tuned up to 100 nm. Tuning occurs by injecting carriers into waveguide sections that are part of the laser, thereby inducing refractive index changes which in turn tune the lasing wavelength through shifts in DBR reflectance spectra and the cavity mode spectrum. Passbands corresponding to different time delays may be designed to be broad and to coincide with laser mode wavelengths tuning. In this case, laser tuning may occur via mode hopping, a discontinuous tuning technique known in the art. Mode-hop-based tuning alleviates wavelength accuracy requirements and enables high speed wavelength switching and settling.

Broadband source: Multi-wavelength sources may also be obtained by spectral slicing, i.e. demultiplexing (via a diffractive element set, tunable spectral filter, or other suitable multiplexer) of integrated or off-chip broadband sources such as EDFA-based amplified spontaneous emission (ASE) sources or LEDs. Selection of a desired time delay by selection of a wavelength may occur at any point in the optical signal path, e.g., prior to diffractive element set 304, between set 304 and switch 306, between switch 306 and diffractive element sets 312 . . . 312p, or between sets 312a . . . 312p and the output optical port. Alternatively, the additional diffractive element sets 312a . . . 312p may be made wavelength-specific and tunable (as described in the references) for selecting the wavelength-dependent time delay. These and other suitable variations fall within the scope of the phrase "operational state of the light source".

HBR-stabilized external cavity diode lasers (ECDL): An anti-reflection-coated DFB or Fabry-Perot-cavity-type laser, wavelength-stabilized with HBR wavelength lockers, may form the basis of a multi-wavelength laser array. This technique is disclosed in the references. The diffractive element sets comprising the HBR wavelength lockers may be integrated onto the same substrate as the time-delay module, if desired. Incorporation of intra-cavity E/O crystals has been shown to enable tuning rates of 23 GHz/µs.

In the exemplary embodiments disclosed herein and variations thereof, the 1×N switch part of the delay module may be integrated via hybrid or monolithic methods. Connection to the switch part may be fiber-based or direct-chip to-chip interfacing of devices (hybrid integration). Same-substrate integration (monolithic integration) is also possible and should be considered within the scope of the present disclosure or appended claims. Integration with various types of switches, i.e. Mach-Zehnder-based switches, waveguide-sampled diffractive element sets with phase modulators, or other suitable switches shall fall within the scope of the present disclosure or appended claims.

It should be noted that the time delay module may be designed to be substantially temperature independent over a selected operational temperature range. Specifically, the temperature dependence of the operating wavelength of all components may be measured by means known in the art. Subsequently, the wavelength channels of the time delay module may be designed to be broad enough (in spectral width) so that the temperature-dependent wavelengths fall within the corresponding wavelength channel pass bands despite temperature changes over a desired operational temperature range, thereby achieving essentially temperature independent operation. Furthermore, substantially athermal operation of the time delay modules may be achieved though incorporating in the planar waveguide device materials with suitably chosen, e.g., negative, thermo-optic coefficients. This method is disclosed in the references.

In an exemplary use, a time delay module as disclosed herein may be used for variably time-delaying an electronic RF signal, such as might be required in phased radar or other RF applications. An electronic RF input signal to be variably delayed is used to modulate the optical source (by direct modulation, or by driving an external modulator, or otherwise). Based on the selected time delay, the operational state of the light source 302 is set to yield a certain wavelength-dependent time delay (resulting from passage of the modulated optical signal through diffractive element set 304), while the operational state of the 1×N switch 306 is selected to yield an additional time delay. The modulated and time-delayed optical signal reaches the photodetector 308, and is there converted back to an RF electronic signal with the desired variable time delay relative to the input RF electronic signal.

In the embodiments discussed thus far a common output port is employed for receiving from the 1×N switch the time delayed signal, either on a photodetector or by an output waveguide or fiber. In an alternative embodiment, the 1×N switch is replaced by a 1×N power splitter, and each output of the splitter is received by a separate output channel of an output array (photodetector array, waveguide array, fiber array, etc). The optical source produces all wavelength channels simultaneously, which are all modulated with the input RF signal. The RF-modulated optical signals at the multiple source wavelengths enter the diffractive element set where each signal undergoes a delay that depends on its wavelength. These delayed signals are split by the splitter and each split portion is directed onto a corresponding output channel. A variable wavelength selective element, such as a tunable spectral filter, is placed in each optical path between a splitter output and the corresponding output channel. Each of the N output channels may therefore be dynamically configured to receive an optical signal delayed by a selected one of the wavelength-based delays and the corresponding one of the switch-based delays. By making the diffractive element set dynamically configurable (as described in the references, for example), the wavelength dependence of the time delay may be varied.

One or more of the embodiments disclosed herein may also be adapted for use as a coder producing code sequences for optical code division multiplexing (O-CDMA) based on time-spreading/wavelength-hopping codes. To this end, the multi-wavelength source (source 302 in FIGS. 2A and 2B, for example) is replaced by a pulsed light source, for example a pulsed fiber laser. The spectral band width of the input pulse typically exceeds the bandwidth of the first set of diffractive elements. No modulation is required for use as an O-CDMA coder. The 1×16 optical switch is replaced by a 1×16 power splitter. The coder operated as follows. The first diffractive element set spectrally slices the input pulse and imparts wavelength-dependent time delays the spectrally sliced components. In the exemplary embodiment, sixteen spectral slices are generated and time delayed. The signal exiting the first diffractive element set comprises a time sequence of sixteen pulses of differing wavelengths, which is split by the 1×16 power splitter. Each of the 16 split portions of the pulse sequence undergoes an additional fine time delay when interacting with the corresponding additional set of diffractive elements (as described hereinabove) for routing to the output. Alternatively, the time delays may be incorporated in the power splitter itself in the from of path length differences of the various power splitter arms. Somewhere in each of the 16 optical signal paths connecting the arms of the power splitter to the output is a tunable spectral filter that selects one of the sixteen spectral slices and its corresponding time delay. The output of all the arms of the power splitter in from of sixteen brief pulse that have been coarse and fine-time delayed by the first and additional set of diffractive elements is combined into the output code sequence. Combination of the sixteen time-delayed pulses into the final code sequence may be achieved in a variety of ways, including but not limited to the following. The outputs of the additional diffractive element sets may be directed into the inputs of a 16×1 power combiner and combined into the output code sequence. A multiplexer or reconfigurable optical add-drop multiplexer (adding the sixteen wavelength slices) may be used to combine the sixteen pulses into the output code sequence. An additional embodiment may be used for decoding an O-CDMA-encoded optical signal, i.e., as a decoder. The decoder comprises the same components as the encoder described hereinabove, but used in reverse. The time delays in the decoder are chosen to reverse the time delays of the sequence and shift all spectral slices to a common temporal position. It should be noted that the first set of diffractive elements by itself provides the function of spectral slicing and time-delaying which is essential for coding and decoding in O-CDMA. In other words, the additional fine time delay is not necessarily required for implementing O-CDMA coding and decoding.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An apparatus, comprising:
 a first optical waveguide substantially confining in one transverse dimension an optical signal propagating in two dimensions therein, the first optical waveguide having a first set of diffractive elements configured and positioned for routing at least a portion of an optical signal propagating in the optical waveguide between an input optical port and a switch input optical port;
 an optical source positioned for launching an optical signal into the optical waveguide through the input optical port;
 a 1×N optical switch connecting the switch input optical port to any one of N switch output optical ports based on a selected operational state of the 1×N optical switch; and
 a second optical waveguide substantially confining in one transverse dimension an optical signal received from any of the N switch output optical ports and propagating in two dimensions therein, the second optical waveguide having N additional sets of diffractive elements, each set of the N additional sets of diffractive elements corresponding to one of the N switch output optical ports and being configured and positioned for routing at least a portion of an optical signal received from the corresponding one of the N switch output optical ports to an output optical port,
 wherein:
 the first diffractive element set is adapted for imparting a wavelength-dependent optical delay onto the routed portion of the optical signal;
 the N additional diffractive element sets and the output optical port are positioned relative to the switch output optical ports so that each corresponding optical path-length between each of the switch output optical ports and the output optical port varies among the switch output optical ports;
 an optical signal at only a selected one of multiple optical source wavelengths reaches the output optical port based on a selected operational state of the optical source; and
 optical propagation time delay between the input optical port and the corresponding output optical port varies according to the selected operational state of the 1×N optical switch and according to the selected operational state of the optical source.

2. The apparatus of claim 1, further comprising a photodetector for receiving optical signals at the output optical port.

3. The apparatus of claim 1, wherein the first optical waveguide, the 1×N optical switch, and the second optical waveguide are integrated onto a common waveguide substrate.

4. The apparatus of claim 1, wherein adjacent ones of the N additional diffractive element sets occupy spatially overlapping areas of the second optical waveguide.

5. The apparatus of claim 1, wherein adjacent ones of the N additional diffractive element sets occupy spatially distinct areas of the second optical waveguide.

6. The apparatus of claim 1, wherein:
the first diffractive element set comprises subsets of diffractive elements; and
each diffractive element subset routes at least a portion of an optical signal at a corresponding one of the multiple source wavelengths between the input optical port and the switch input optical port.

7. The apparatus of claim 6, wherein the diffractive element subsets are arranged so as to impart the wavelength-dependent optical delay onto the corresponding portions of the optical signal routed thereby.

8. The apparatus of claim 6, wherein each diffractive element subset routes at least a portion of an optical signal at a corresponding one of the multiple source wavelengths between the input optical port and the switch input optical port through a corresponding optical fiber delay line or through a corresponding optical waveguide delay line, thereby imparting the wavelength-dependent optical delay onto the corresponding portions of the optical signal.

9. The apparatus of claim 6, wherein adjacent ones of the multiple diffractive element subsets occupy spatially overlapping areas of the first optical waveguide.

10. The apparatus of claim 6, wherein adjacent ones of the multiple diffractive element subsets occupy spatially distinct areas of the first optical waveguide.

11. The apparatus of claim 1, wherein the first diffractive element set has a monotonically varying element spacing so as to impart the wavelength-dependent optical delay onto the portion of the optical signal routed thereby.

12. The apparatus of claim 1, wherein the optical source comprises a multiplexed laser array, a filtered laser array, a tunable laser, a filtered broadband light source, an externally-modulated laser, or an external-cavity stabilized laser.

13. The apparatus of claim 1, wherein:
the optical source comprises an array of lasers, each positioned for launching a corresponding optical signal into a corresponding input optical port at a corresponding source wavelength; and
optical propagation time delay between each corresponding input optical port and the corresponding output optical port varies according to the selected operational state of the 1×N optical switch and according to the corresponding source wavelength.

14. An apparatus, comprising:
a 1×N optical switch connecting a switch input optical port to any one of N switch output optical ports based on a selected operational state of the 1×N optical switch; and
an optical waveguide substantially confining in one transverse dimension an optical signal received from any of the N switch output optical ports and propagating in two dimensions therein, the optical waveguide having N sets of diffractive elements, each set of diffractive elements corresponding to one of the N switch output optical ports and being configured and positioned for routing at least a portion of an optical signal received from the corresponding one of the N switch output optical ports to an output optical port,
wherein the N diffractive element sets and the output optical port are positioned relative to the switch output optical ports so that each corresponding optical pathlength between each of the switch output optical ports and the output optical port varies among the switch output optical ports, thereby resulting in an optical propagation time delay between the switch input optical port and the output optical port that varies according to the selected operational state of the 1×N optical switch.

15. The apparatus of claim 14, wherein adjacent ones of the N additional diffractive element sets occupy spatially overlapping areas of the second optical waveguide.

16. The apparatus of claim 14, wherein adjacent ones of the N additional diffractive element sets occupy spatially distinct areas of the second optical waveguide.

17. An apparatus, comprising:
an optical waveguide substantially confining in one transverse dimension an optical signal propagating in two dimensions therein, the optical waveguide having a set of diffractive elements configured and positioned for routing at least a portion of an optical signal propagating in the optical waveguide between an input optical port and an output optical port; and
an optical source positioned for launching an optical signal into the optical waveguide through the input optical port,
wherein:
the diffractive element set is adapted for imparting a wavelength-dependent optical delay onto the routed portion of the optical signal; and
an optical signal at only a selected one of multiple optical source wavelengths reaches the output optical port based on a selected operational state of the optical source, thereby resulting in an optical propagation time delay of an optical signal launched from the optical source between the input optical port and the output optical port that varies according to the selected operational state of the optical source.

18. The apparatus of claim 17, wherein:
the first diffractive element set comprises subsets of diffractive elements; and
each diffractive element subset routes at least a portion of an optical signal at a corresponding one of the multiple source wavelengths between the input optical port and the switch input optical port.

19. The apparatus of claim 18, wherein the diffractive element subsets are arranged so as to impart the wavelength-dependent optical delay onto the corresponding portions of the optical signal routed thereby.

20. The apparatus of claim 18, wherein each diffractive element subset routes at least a portion of an optical signal at a corresponding one of the multiple source wavelengths between the input optical port and the switch input optical port through a corresponding optical fiber delay line or through a corresponding optical waveguide delay line, thereby imparting the wavelength-dependent optical delay onto the corresponding portions of the optical signal.

21. The apparatus of claim 18, wherein adjacent ones of the multiple diffractive element subsets occupy spatially overlapping areas of the first optical waveguide.

22. The apparatus of claim 18, wherein adjacent ones of the multiple diffractive element subsets occupy spatially distinct areas of the first optical waveguide.

23. The apparatus of claim 17, wherein the first diffractive element set has a monotonically varying element spacing so as to impart the wavelength-dependent optical delay onto the portion of the optical signal routed thereby.

24. The apparatus of claim 17, wherein the optical source comprises a multiplexed laser array, a filtered laser array, a tunable laser, a filtered broadband light source, an externally-modulated laser, or an external-cavity stabilized laser.

25. The apparatus of claim 17, wherein:
the optical source comprises an array of lasers, each positioned for launching a corresponding optical signal into a corresponding input optical port at a corresponding source wavelength; and
optical propagation time delay between each corresponding input optical port and the corresponding output optical port varies according to the selected operational state of the 1×N optical switch and according to the corresponding source wavelength.

* * * * *